Dec. 1, 1942.                M. F. MAJESTIC                2,303,566
                            CITY CHICKEN MACHINE
                            Filed Oct. 23, 1940

MITCHELL F. MAJESTIC, Inventor

By W. B. Harpman, Attorney

Patented Dec. 1, 1942

2,303,566

UNITED STATES PATENT OFFICE 2,303,566

CITY-CHICKEN MACHINE

Mitchell F. Majestic, Youngstown, Ohio

Application October 23, 1940, Serial No. 362,403

5 Claims. (Cl. 17—1)

This invention relates to a city chicken machine.

The principal object of the invention is the provision of a machine so designed as to simplify the formation of city chicken, a well known meat product wherein alternate pieces of pork and veal are positioned upon a wooden skewer in a manner so as to simulate a chicken leg.

A further object of the invention is the provision of a machine provided with means for insuring the accurate positioning of the portion of meat used and means for holding the meat in proper position while simultaneously forcing a wood skewer through each of the assembled portions, thus completing the formation of the city chicken meat product.

It is well known that considerable quantities of veal and pork are sold in retail in the form of city chicken, which comprises a meat product built up of alternate squares of veal and pork impelled upon a wooden skewer. In forming these products the butchers commonly cut squares of veal and pork and manually place them one after the other over the pointed wooden end of the skewer. This results in accidents to the fingers, and due to repeated breaking of skin on these sharply pointed wooden skewers infection of the fingers is not uncommon. In order to avoid these difficulties and to make the formation of this meat product a simpler and easier task, I have devised means whereby the cut pieces of veal and pork are placed in suitable compartments in the machine and the necessary wooden skewers placed adjacent the compartments and subsequently forced through the meat by means of another portion of the machine, thus avoiding possible injury to the butcher's fingers and at the same time greatly speeding up the formation of this specific meat product and at the same time eliminating a great deal of the work commonly associated therewith.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawing, wherein.

Figure 1:
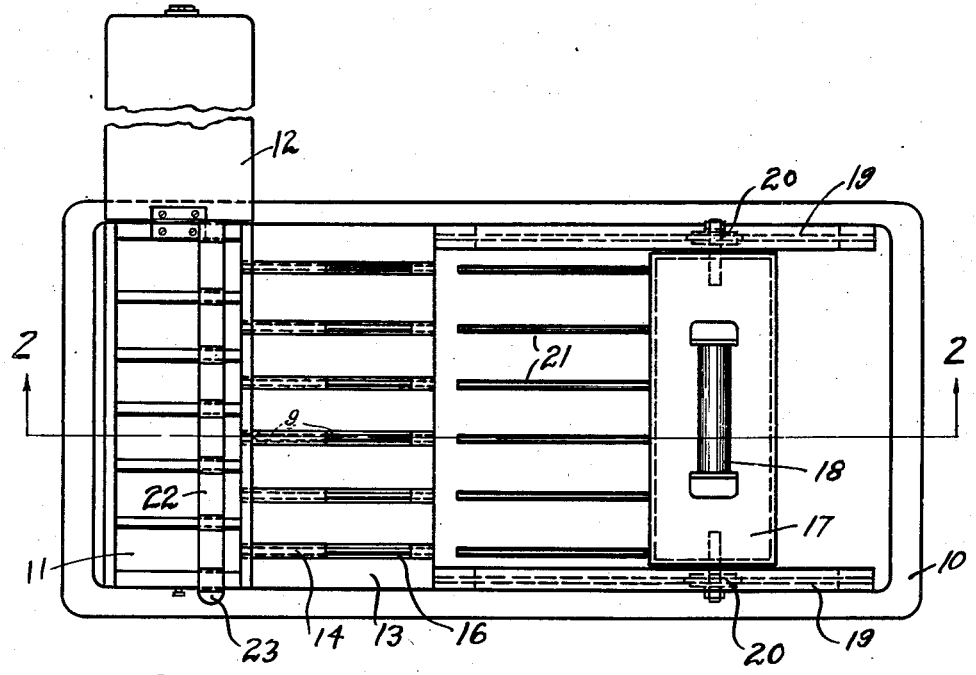
Figure 1 is a top plan view of the city chicken machine showing the lid portion in open position as for the reception of the pre cut portions of meat preliminary to placing the skewers therethrough.
Figure 2:
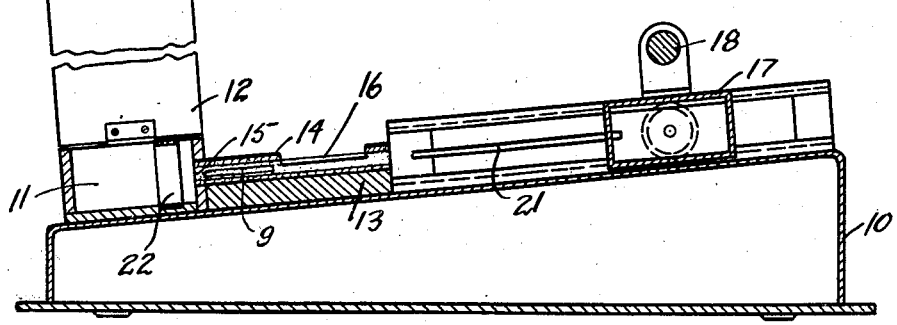
Figure 2 is a cross sectional view taken on line 2—2 of Figure 1 and shows in detail the space provided for the reception of the cut meat as well as the space in which the wooden skewers are positioned prior to forcing the same into the meat.

By referring to the drawing it will be seen that the machine comprises a base 10 elevated at one end thereof in relation to the other and carrying at the lower end a plurality of rectangular shaped compartments 11 each of which is adapted to receive a plurality of cut pieces of meat through which a skewer 9 is to be positioned. The plurality of compartments 11 are provided with a lid 12 so that meat may be securely positioned therein during the time the skewers are forced therethrough. Immediately in front of the compartments 11 there is positioned a block 13 which is provided with a plurality of axially extending tubes 14 which in turn communicate with each of the compartments 11 by means of openings 15 formed in the dividing wall. Each of the axially extending tubes 14 is provided with a cut out section 16 to enable the placement therein of a wooden skewer 9 which itself comprises a wooden stick with a pointed end.

It will be observed that due to the slope of the upper surface of the machine, skewers 9 upon being placed in the axially extending tubes 14 through the openings 16 thereof will tend to move downwardly to the left so that their pointed ends enter the openings 15 and bear against the meat in the compartments 11. When meat has been positioned in all of the compartments 11 and wooden skewers 9 in all of the axially extending tubes 14, a block 17 carrying a handle 18 and positioned upon the base 10 by means of parallel guides 19 in which wheels 20 affixed to the block 17 function, and carrying a plurality of rods 21, is then used to force the skewers 9 into the meat. This is accomplished by the rods 21 entering the uppermost end of the axially extending tubes 14 and contacting the skewers 9 and subsequently pushing them into the compartments 11 and thus completely into and through the meat which may be positioned therein. The guides 19 are so formed that the movement of the block 17 is limited or stopped after the skewers 9 have penetrated the meat and been driven against the outermost end wall of the compartment 11 sufficiently to have dulled the sharp points thereof. The lid 12 is then opened and a metal strap 22 positioned continuously across the bottoms of each of the compartments 11 is moved upwardly by means of a tab 23, thus readily removing the completed city chickens from the machine. It will be observed that if desirable the structure of the machine forming the compartments 11 may be removably attached to the base 10 thus permitting this particular portion of the machine to be disassembled and cleaned when necessary. The meat comes in contact with only this portion of the machine and therefore no further provision for cleaning is necessary. It is obvious that the guide wheels 20 might be dispensed with without affecting the essential operation of the machine and that other minor modifications may be made if desirable.

It will also be seen that the meat product known as city chicken may be produced economically in safety and considerably faster by the use of this machine than has heretofore been possible, and that the machine itself is simply and sturdily constructed and relatively inexpensive in manufacture.

It will be noted that if desirable, mechanical motion may be applied to the rods 21 by way of the block 17 to drive the skewers into the meat although it is believed that in its most practical form the provision of a handle for manual movement is satisfactory.

Having thus described my invention what I claim is:

1. A city chicken machine comprising a base one end of which is elevated in relation to the other, a plurality of removable compartments positioned on the lower end of the said base and adapted to hold cut sections of meat, and guide means positioned in front of the said compartments and adapted to retain and guide wooden skewers so as to center them with respect to the meat in the said compartments, together with means for forcing the wooden skewers into the compartments and through the meat therein.

2. A city chicken machine comprising a base elevated at one end in relation to the other, a plurality of removable compartments adapted to contain slices of meat positioned on the lower end, guide means positioned in front of the said compartments and comprising an axially extending tube partially cut open centered with respect to each of the compartments and adapted to retain and guide wooden skewers placed therein, a pair of parallel guide members positioned on the said base in front of the said guide means, a block positioned between the said parallel guide members, and a plurality of rods positioned on the said block each of which is adapted to engage one of the said axially extending guide tubes so that manual movement imparted to the block causes the rods to push wooden skewers through the guide tubes into the meat containing compartments.

3. A city chicken machine comprising a base, a plurality of removable compartments affixed to the said base and adapted to contain meat, a lid for said compartments for holding the meat therein and a strap crossing each of the said compartments for removing the meat therefrom, guide means positioned in front of the said compartments and adapted to receive and guide wooden skewers positioned therein so as to center the same in respect to an axially extending line through each of the said meat receiving compartments, parallel guides positioned on the said base, a block positioned therebetween and guided thereby, and rods formed on the said block and adapted to engage the ends of the skewers positioned in the said guide means so that the same may be forced through the meat in the compartments thereby.

4. In a machine of the character described, the combination of a base member having a plurality of guide members positioned thereon and adapted to receive and guide wooden skewers positioned therein, means adapted to engage the said skewers in the guide members so as to move the same, and a plurality of removable compartments affixed to the said base and adjacent the said guide members and in registry with the said guide members and adapted to contain and hold meat, so that the said skewers may be forced through the meat in the said compartments.

5. In a meat machine the combination of a plurality of removable compartments adapted to contain and hold meat in desirable position therein, and means for forcing skewers through the meat in each of the said compartments, said means comprising a plurality of tubular guide members positioned on said base adjacent the said compartments and communicating therewith and a block movably mounted on said base and provided with a plurality of rods adapted to engage the said tubular guides so that movement of the said block and rods toward the said compartments results in moving the skewers placed in said tubular guide members into the said compartments and through meat firmly held therein.

MITCHELL F. MAJESTIC.